United States Patent
Grosse et al.

(10) Patent No.: US 11,388,375 B2
(45) Date of Patent: Jul. 12, 2022

(54) METHOD FOR CALIBRATING IMAGE CAPTURING SENSOR CONSISTING OF AT LEAST ONE SENSOR CAMERA, USING TIME CODED PATTERNED TARGET

(71) Applicant: Cognex Corporation, Natick, MA (US)

(72) Inventors: Marcus Grosse, Jena (DE); Bastian Harendt, Jena (DE)

(73) Assignee: Cognex Corporation, Natick, MA (US)

( * ) Notice: Subject to any disclaimer, the term of this patent is extended or adjusted under 35 U.S.C. 154(b) by 144 days.

(21) Appl. No.: 16/225,662

(22) Filed: Dec. 19, 2018

(65) Prior Publication Data
US 2019/0132560 A1 May 2, 2019

Related U.S. Application Data

(63) Continuation of application No. PCT/EP2017/065120, filed on Jun. 20, 2017.

(30) Foreign Application Priority Data

Jun. 20, 2016 (DE) .......................... 102016111226.7

(51) Int. Cl.
*H04N 9/31* (2006.01)
*G06T 7/80* (2017.01)
(Continued)

(52) U.S. Cl.
CPC ........... *H04N 9/3147* (2013.01); *G01C 25/00* (2013.01); *G06T 7/80* (2017.01); *H04N 17/002* (2013.01)

(58) Field of Classification Search
CPC ...... H04N 9/3147; H04N 17/002; G06T 7/80; G01C 25/00
See application file for complete search history.

(56) References Cited

U.S. PATENT DOCUMENTS 8,619,144 B1 * 12/2013 Chang ....................... G06T 7/80
348/187
2008/0062164 A1 3/2008 Bassi
(Continued)

FOREIGN PATENT DOCUMENTS

| CN | 102947670 A | 2/2013 |
|----|-------------|--------|
| CN | 104885383 A | 9/2015 |

(Continued)

OTHER PUBLICATIONS

Grosse et al., Camera calibration using time-coded planar patterns. Optical Engineering. Aug. 2012;51(8):083604.

*Primary Examiner* — Jianxun Yang
(74) *Attorney, Agent, or Firm* — Wolf, Greenfield & Sacks, P.C.

(57) ABSTRACT

A method for calibrating an image capturing sensor including at least one sensor camera using a time coded pattern target including: displaying the target on a flat screen display, displaying a pattern sequence on the display and capturing the pattern sequence by the at least one sensor camera as a sequence of a camera images, performing an association between pixels of the target and captured image points of the camera images for at least one fixed position of the display in space or respectively for at least two different positions of the display in space, performing the calibration through corresponding points, performing a gamma correction wherein a gamma curve of the display is captured and corrected in any position of the display and/or in addition to capturing the pattern sequence in any position of the display by the at least one sensor camera before displaying the target.

16 Claims, 8 Drawing Sheets

(51) Int. Cl.
    *G01C 25/00*    (2006.01)
    *H04N 17/00*    (2006.01)

(56) References Cited

U.S. PATENT DOCUMENTS

| | | | | | |
|---|---|---|---|---|---|
| 2009/0027523 | A1* | 1/2009 | Chang | ............... | H04N 9/3182 |
| | | | | | 348/254 |
| 2012/0287287 | A1* | 11/2012 | Grossmann | .......... | H04N 17/002 |
| | | | | | 348/181 |
| 2013/0278787 | A1* | 10/2013 | Shpunt | ............... | H04N 5/37452 |
| | | | | | 348/218.1 |

FOREIGN PATENT DOCUMENTS

| CN | 105491315 A | 4/2016 |
|---|---|---|
| WO | WO201114376 A2 | 11/2011 |

* cited by examiner

METHOD FOR CALIBRATING IMAGE CAPTURING SENSOR CONSISTING OF AT LEAST ONE SENSOR CAMERA, USING TIME CODED PATTERNED TARGET

RELATED APPLICATIONS

This application is a continuation of International application PCT/EP2017/065120, filed on Jun. 20, 2017, claiming priority from German patent application 10 2016 111 226.7, filed on Jun. 20, 2016, all of which are incorporated in their entirety by this reference.

FIELD OF THE INVENTION

The invention relates to a method for calibrating an image capturing sensor including at least one sensor camera using a time coded pattern target.

The invention relates to calibrating cameras themselves, calibrating plural cameras relative to each other and calibrating a sensor including plural cameras with reference to external coordinate systems.

BACKGROUND OF THE INVENTION

Methods of this type are particularly relevant for various calibration methods.

A calibration task is for example determining the inner/intrinsic parameters of a camera. Thus, the important parameters are a distance of the projection plane from the projection center (focal length/image distance/chamber constant/camera constant), the intersection point of image plane and optical axis (principal point) and distortion parameters. Another embodiment is a determination of an orientation of two or more cameras relative to each other through external/extrinsic parameters. Thus, rotation matrixes and translation vectors are determined between the coordinate systems of the cameras. Additionally, determining an orientation of a multi-camera system can be performed with respect to an external machine coordinate system.

The coordinate system of the camera system (sensor) is determined with reference to a coordinate system of a robot or a coordinate measuring machine. The sensor is either attached non-moveable (thus rigid with respect to the machine coordinate system) or attached as a tool at the machine (thus rigid with respect to the tool coordinate system of the machine). This problem is also known under the term "hand-eye calibration".

Another application is determining a rotation axis of a turntable, thus position and direction of the rotation axis in a coordinate system of a multi-camera system (3D-sensor).

The background is a rotating disc for 3D all around measurement of objects with the 3D sensor.

Another application is determining a movement direction of a conveyor belt in a coordinate system of a multi-camera system (3D-sensor). This is used for measuring moving objects on a conveyor belt.

Typically targets with three dimensional markers, e.g., checkerboard patterns or coded circular markets are used for calibration purposes. Independently therefrom the concept of time coding exits in 3-D measurement. Thus, patterns are projected onto the objects to be measured. Thus, each object point receives a unique time coding.

A time coding is also possible that is applied to a calibration target. Thus, the time coding patterns are not projected by a projector but represented by a screen. Thus, the screen is the calibration target.

Using the method according to the invention for calibrating an image capturing sensor including at least one sensor camera using a time coded pattern target includes displaying the time coded pattern target on a flat screen display, wherein a pattern sequence is displayed on the flat screen display and captured by the at least one sensor camera as a sequence of a camera images. Thus, an association between pixels of the time coded pattern target and captured image points of the camera images is performed for at least one fixed position of the flat screen display in space or respectively for at least two different positions of the flat screen display in space, wherein the calibration is performed through corresponding points. Thus, a gamma correction is performed wherein a gamma curve of the flat screen display is captured and corrected in any position of the flat screen display and/or in addition to capturing the pattern sequence in any position of the flat screen display by the at least one sensor camera before displaying the time coded pattern target.

In one embodiment a time sequence of homogenous gray scale images is displayed on the flat screen display during gamma correction and captured by the at least one sensor camera, wherein a gamma curve of the flat screen display is determined, and a correcting gamma curve is subsequently generated, wherein the elements of the pattern sequence that are to be represented on the flat screen display are being displayed according to the correcting gamma curve.

In one embodiment a time sequence of gray scale images is displayed for each relative position between the flat screen display and the image capturing sensor in addition to the pattern sequence wherein a correcting gamma curve is generated from the sequence of the gray scale images for the entire image (more precisely, the entire display portion of the flat screen display) or for each image point within the sensor camera, wherein a gamma correction of the images within the pattern sequence is subsequently performed. Using the gamma correction images of the pattern sequence captured by the sensor camera or images of the pattern sequence that were previously shown on the flat screen display can be corrected.

In one embodiment an additional automatic adaptation of the exposure time of each sensor camera is performed when capturing the flat screen display in a fixed position in space wherein a homogenous white image is displayed on the flat screen display and captured by the sensor camera, wherein an exposure time of the sensor camera is controlled so that a brightest point on the flat screen display is captured with a predefined intensity value by the sensor camera at an end value of the exposure time.

Also, other alternative optimization criteria are possible, e.g., so that the percentage of image points for which the intensity value captured in the sensor camera exceeds a predetermined intensity value shall not exceed a predetermined maximum value, thus, e.g., for 10% of the image points at the most the gray scale value shall be above 250. In one embodiment only a portion of pixels and captured image points is associated with each other in a first step when associating the pixels of the time coded pattern target and the captured image points and generating the data volume of the point correspondences for each relative position of the flat screen display with respect to the image capturing sensor, wherein a homography between the displayed and the captured pattern images is computed from the associations thus obtained which limits relevant search portions for additional associations between the displayed and captured pattern images. The overall idea is to reduce computation time when associating the corresponding points.

In one embodiment an association is performed between the pixels of the time coded pattern target and the captured image points and the generation of the data volume within a predefined grid. Also here the background is shortening the computation time when associating corresponding points.

In one embodiment a tablet computer with a program running on the table computer is used as the flat screen display, and/or with a program for generating and displaying the time coded pattern target that runs on an external control unit that communicates wirelessly with the tablet computer.

In one embodiment the pattern sequence of the time coded pattern target is made from a sequence of statistically generated patterns.

In one embodiment the pattern sequence of the time coded pattern target includes a sequence of regular patterns, in particular stripe patterns or checker board patterns. The stripe patterns can have a binary or continuous intensity distribution. Sine shaped (1+cos) stripe patterns are particularly relevant which facilitates achieving a high precision of point association even for a small number of patterns.

In one embodiment the flat screen display is arranged on a conveying device that moves in a linear manner, wherein the movement direction of the conveying device is determined with reference to the image capturing sensor by a linear movement of the flat screen display caused by a linear movement of the conveying device.

In one embodiment the flat screen display is arranged on a rotating arrangement wherein a position and orientation of the rotation axis of the rotating arrangement is determined with reference to the image capturing sensor by an angular movement of the flat screen display by a rotation of the rotating assembly.

In one embodiment the flat screen display is arranged on moving components of a robot arrangement, wherein a position and orientation of the basic coordinate system of the robot arrangement is determined with reference to the image capturing sensor by a rotation and/or linear movement of one or plural of the moving components of the robot arrangement.

In one embodiment the image capturing sensor is connected with a tool point of a robot arrangement and the flat display is statically arranged with reference to the robot arrangement so that a position and orientation of the tool coordinate system of the robot arrangement is determined with reference to the image capturing sensor by a rotation and/or linear movement of the tool point of the robot arrangement and thus of the image capturing sensor.

In one embodiment the flat screen display is captured in different positions and/or orientations relative to the image capturing sensor and inner imaging parameters of each individual sensor camera and/or the position and/or orientation of the sensor cameras relative to each other are determined.

Thus, it is within the spirit and scope of the invention to use a tablet computer for performing the described and claimed method.

BRIEF DESCRIPTION OF THE DRAWINGS

The invention will be subsequently described based on embodiments with reference to drawing figures, wherein.

DETAILED DESCRIPTION OF THE INVENTION

Figure 1:
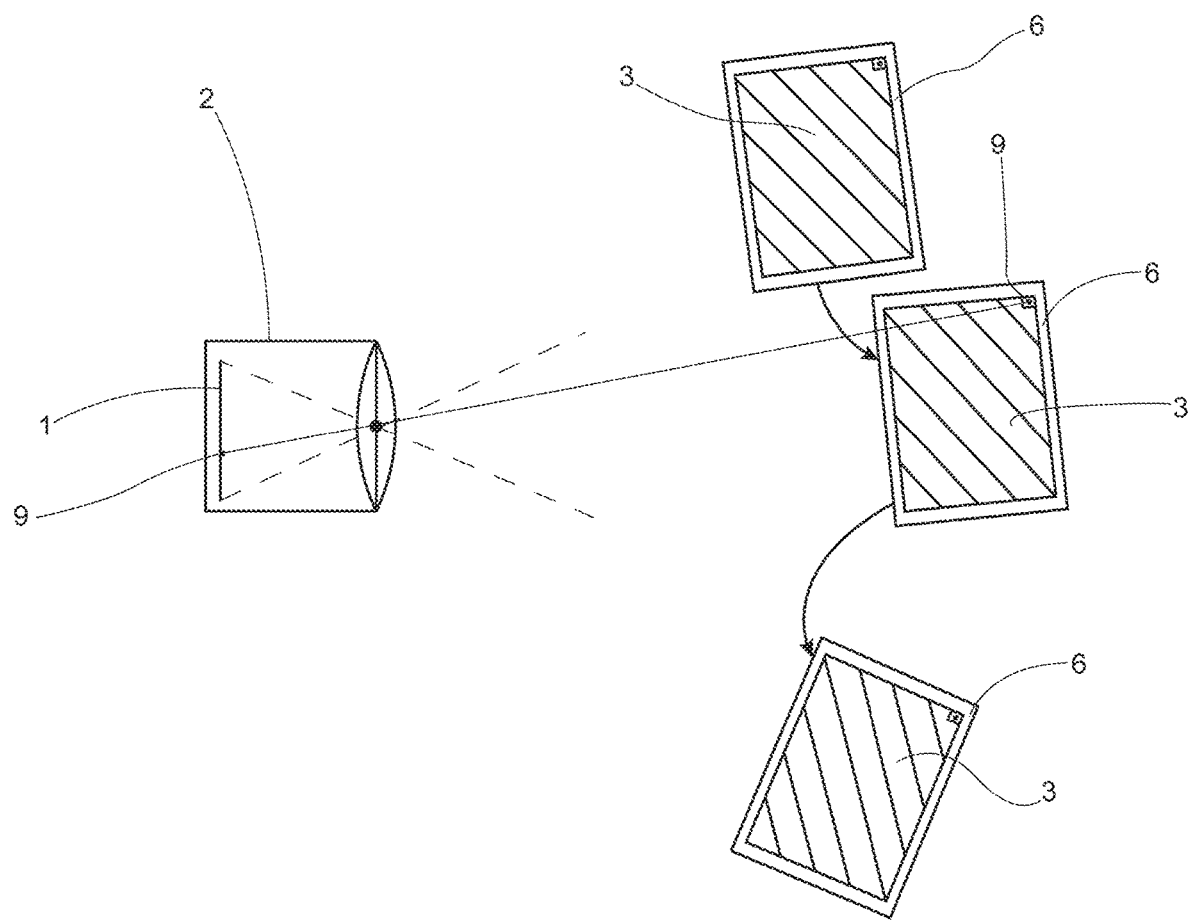
FIG. 1 illustrates an exemplary embodiment where a method of the invention may be practiced that has a flat screen display that moves to various positions in space.

Subsequently the method shall be described in more detail in an exemplary manner.

With respect to the method not the calibration itself but the calibration target is particular. Compared to spatial markers a target with a time based marker has the following advantages:

time coding generates a large number of markers; each pixel of the screen thus becomes a marker;

the markers can fill the viewing area of the cameras completely as long as the screen is large enough. Therefore markers can still be registered at an edge of the camera images. This is relevant for determining distortion parameters during internal calibration;

the unique registration of the markers is very reliable, precise and simple due to the time based coding; and an incomplete visibility of the calibration target, e.g. due to coverage does not influence the calibration principle.

During calibration one camera is used or plural cameras are used in combination and are controlled by a PC. For a calibration target e.g. a tablet is used that is connected with the PC through WLAN. The patterns which shall be displayed on the tablet are provided in advance. Statistically generated patterns are used, thus a random time coding. But also other time based coding techniques, e.g. stripe projection are conceivable.

The following steps are being performed:

Step 1: Coarse gamma correction

Initially the gamma curve of the tablet is captured in advance and corrected in a coarse manner. Thus, the camera captures the tablet while a sequence of homogenous gray scale images is displayed on the tablet. Thus the gamma curve of the tablet is determined from the captured gray scale images. Thus the following relationship holds:

$$\text{gray scale}_{camera} = m \times \text{gray scale}_{tablet}^{\gamma} + n$$

As a matter of principle also other non-linear relationships can be corrected. The gamma curve, however, is most important in practical applications. The pattern images that are to be displayed on the tablet are corrected according to the determined gamma value:

$$\text{gray scale}_{tablet}' = \text{gray scale}_{tablet}^{-\gamma}$$

Thus, a linear context remains between the gray scale values of the tablet and the gray scale values of the at least one camera. Actually this step only provides a coarse correction. A fine correction is performed separately for each measurement. Theoretically a fine correction of this type would suffice. In practical applications, however, this would be associated with a high level of imprecision due to noise which becomes evident in particular by sensor noise and quantification noise. The coarse correction provides that the gray scale range of the camera is better utilized already during image capture. The subsequent fine correction therefore only changes the images very slightly.

Step 2: capture of flat screen displays, gamma correction and point association.

Thus, a capture of the tablet is performed in a fixed position. Selecting the position of the tablet with respect to the sensor is a function of the calibration task.

Optionally the exposure time is adjusted initially automatically for each camera separately with the following steps:

A homogenous white image with maximum brightness is displayed on the tablet in step a. In step b an image is captured by the camera. Eventually an adaptation of the exposure time of the camera is performed in step c until the display range of the tablet is not over controlled. This corresponds to a search for the optimum exposure time at which for example the brightest point of the display portion of the tablet reaches e.g. 95% of the maximum intensity value of the camera. Also other optimization criteria can be used, wherein different algorithms are conceivable for this automatic method. This can be for example a so called bisection.

Thereafter capturing a sequence of homogenous gray scales can be performed in order to perform gamma correction.

Thus, a respective image from the gray scale sequence is displayed on the tablet and captured by the at least one camera. The purpose of the gray scales is a fine gamma correction or generally the correction of a non-linear context between the gray scales of the tablet and the camera.

Capturing a pattern sequence is performed thereafter as follows: An image from the sequence of statistic patterns is now sequentially displayed on the tablet and captured by the at least one camera. Thus, also other pattern types are conceivable, e.g. stripe patterns.

The described sequence of the patterns, this means initially the gray scale images and then the pattern images, an exchanged sequence between the two or even an overlapping sequence is irrelevant for the calibration principle. The only important thing is to know during the subsequent processing which captured image corresponds to which displayed image.

Thereafter a processing of the captured images is performed separately for each camera comprising the steps:

Optionally a determination of the display portion of the display is performed.

From the displayed pattern images and/or the gray scale images a position of the display portion of the display is determined in the camera images.

Thus, the time based variation of the intensity (e.g. the time based standard deviation of the intensity values is used for each image point and each camera. When the time based intensity variation is above a predetermined threshold value the corresponding image point is associated with the display portion of the display. Also additional statistical values like the time based mean of the intensity can be used as an alternative/supplemental criterion. The subsequent steps for determining and correcting the gamma curve and for associating the corresponding image points can be limited to the image points of the display portion of the display thus determined.

Determining and correcting the gamma curve does not have to be performed, however when performed comprises the following steps:

The following relationship is determined for each pixel (u, v) of the camera.

$$\text{gray scale}_{camera}(u,v) = m(u,v) \times \text{gray scale}_{tablet}(u,v)^{\gamma(u,v)} + n(u,v)$$

The captured pattern images are now corrected according to $n(u,v)$, $m(u,v)$ and $\gamma(u,v)$ $$\text{gray scale}_{camera}'(u,v) = [(\text{gray scale}_{camera}(u,v) - n(u,v))/m(u,v)]^{-\gamma(u,v)}$$

Thus also other non-linear relationships can be corrected as a matter of principle.

Alternatively the gamma curve can also be determined individually for the entire image and not for each pixel (u, v) individually:

$$\text{gray scale}_{camera}(u,v) = m \times \text{gray scale}_{tablet}(u,v)^{\gamma} + n$$

The captured pattern images are then corrected according to the parameters $n$, $m$ and $\gamma$:

$$\text{gray scale}_{camera}'(u,v) = [(\text{gray scale}_{camera}(u,v) - n)/m]^{-\gamma}$$

Alternatively also the pattern images that are previously displayed on the flat screen display can be corrected in this case where the gamma curve is not determined for each image point individually but for the entire display portion of the display as follows:

$$\text{gray scale}_{tablet}'(u,v) = m \times \text{gray scale}_{tablet}(u,v)^{\gamma} + n$$

The required association of the corresponding image points is now performed as follows:

Each pixel of the tablet is associated in a first step with a corresponding image point in the camera which images this tablet pixel in a first step precise down to the subpixel. Thus, a similarity of the intensity values of the pattern image sequence is determined wherein the intensity values are displayed at these points in time sequence on the tablet or captured by the camera. A standardized cross correlation or a sum of absolute differences can be used e.g. as a measure of similarity. This is performed as a function of which type of patterns is used but also other similarity measures are conceivable. For sine shaped strip patterns for example so called phase processing can be performed. The standardized cross correlation as well as the phase processing can consider linear relationships between the displayed intensity values and the captured intensity values. Non-linear relationships like a gamma curve cannot be considered. Without a gamma correction that is used according to this method precision of the associated point correspondences is therefore rather bad.

As a result a generated list with point correspondences is provided which is subsequently processed further.

In order to reduce the required computation load several measures are possible that can be performed additionally.

Initially only few points can be associated and from the associated points a so called homography between the tablet and the image plane of the camera can be determined which facilitates limiting the search range for additional point associations. Additionally it is also possible that an image point is not associated in general with each point of the tablet but only with few points from the predetermined grid.

These optional measures for reducing the computation load have the following background: Projecting the points of one plane (herein a flat panel display) into another plane (thus the image plane of the camera) can be described by a so called homography. When the homography is known for a position and orientation of the flat display relative to the camera a corresponding image point can be computed in the camera directly for each point of the flat display. This can be used by initially associating an image point in the camera only in a first relatively large point association without restriction of the search range only with few pixels of the tablet, e.g. from a predetermined grid and computing the coarse homography from these correspondences wherein the coarse homography describes the corresponding projection.

In a second finer point association a corresponding image point in the camera is associated with a significantly greater number of pixels of the flat display, e.g. in a predetermined finer grid or alternatively with all pixels. Now, however, an initial image point is computed in the camera for each pixel of the tablet by using coarse homography and the search of the corresponding image point is limited for this pixel to a portion in the image plane of the camera, e.g. a circle or a rectangle with a predetermined size about each initial image point.

In subsequent step 3 a position of the tablet is changed. It depends on the respective calibration task where the tablet is located and how the position of the tablet is changed. When calibrating a conveyor belt the tablet rests for example on the conveyor belt and is moved by the conveyor belt by a random amount that does not have to be known.

When calibrating a turn table the tablet sits on the turn table and is rotated by the turn table by a random amount that does not have to be known.

When calibrating a robot the tablet is attached at a tool point of the robot in a rigid manner and rotated and/or moved by a random amount. The current transformation between the base coordinate system of the robot and the tool coordinate system of the robot has to be known. However, as a matter of principle it is not a problem to determine this information from the software of the robot and its control.

It depends on the calibration task whether the position of the tablet and/or the position of the cameras is changed. Thus, it is relevant that the relative position and/or orientation of the cameras relative to the display is changed. Where different positions of the flat screen display are recited, in particular in claim 1, this always means that the position and/or orientation of the flat screen display changes with respect to the image capturing sensor.

In a next step 4, the steps 2 and 3 are repeated several times.

Thus, the tablet is captured at various positions. The number of the positions depends on the calibration task. As a result, a list with point correspondences is obtained after several applications of steps 2 and 3 for each position of the tablet and for each of the at least one camera of the image generating sensor, thus a list with pixels of the tablet to which the respective image point in the respective camera is associated.

In the next step 5 the actual calibration task can be performed using the list of point correspondences which have been determined in step 4 using the steps 2 and 3. The actual procedure depends on the calibration task as emphasized by the subsequent examples.

When calibrating a turntable the procedure is as follows:

The tablet is placed on the turntable. The tablet has to be fixed at the turntable, thus it does not have to slide when the turntable is rotated. Thereafter, the tablet is captured by a sensor that includes two cameras as described in step 2. Thus, the sensor has to be calibrated by itself in advance. Thus, the turntable is rotated by a random variable amount after each capture together with the tablet. Subsequently, the tablet is captured, e.g., at ten different angular positions of the turntable.

Thus, two lists with point correspondences are generated for each angular position of the turntable, this means a list is generated for each camera. Now, the two corresponding image points are filtered out in both cameras in these lists for each pixel of the tablet. From these coordinates of the two corresponding image points a position in space of the corresponding tablet-pixel can be reconstrued by triangulation as usual since the sensor itself was calibrated separately before.

When step 4 recited supra is repeated for each angular position of the turntable and for each pixel of the tablet, a circular trajectory is obtained for each pixel of the tablet, wherein the circular trajectory describes the pixels during the rotation of the turntable. For each trajectory a plane can be determined by plane fitting wherein the trajectory is located in the plane. By the same token, the center of the circle can be determined by a circular fit.

The planes of the trajectories always have the same orthogonal vector that defines an orientation of the rotation axis of the turntable. From the centers of the circular trajectories a position of the rotation axis can be determined in addition to the direction of the rotation axis.

When performing a hand-eye calibration the table is fixed at the tool point of the robot and the sensor, including two cameras, is fixed with respect to the base of the robot. The tablet is now captured by the sensor wherein the sensor should have been calibrated separately before, however, as a matter of principle it is possible to also determine the intrinsic and extrinsic parameters of the camera system itself during the hand-eye calibration. Simultaneously the actual posture of the robot, this means its position and orientation of the tool point relative to the base coordinate system of the robot, is stored.

The position and/or orientation of the table is now changed in that the posture of the robot, this means the position and orientation of the tool point, is adjusted. For each posture of the robot, two lists with point correspondences are now obtained, this means one list for each camera. Now the two corresponding image points are filtered out in both cameras in these lists for each pixel of the tablet. From these coordinates of the two image points, the position in space of the corresponding tablet pixel can be reconstrued as usual by triangulation, namely the sensor itself was previously calibrated separately. From the 2-D coordinates of the tablet pixels and the associated reconstrued 3-D coordinates, the position and orientation of the tablet relative to the sensor coordinate system can be computed in a known manner for each posture of the robot.

The preceding steps provide the position and orientation of the tool point with respect to the base coordinate system of the robot and additionally the position and orientation of the table with respect to the sensor coordinate system for each posture of the robot. The position and orientation of the sensor with respect to the base coordinate system of the robot can be computed in a known manner from these corresponding positions and orientations.

FIG. 1 illustrates an exemplary embodiment where a method of the invention may be practiced. This exemplary embodiment includes a sensor camera 2 having an image capturing sensor 1 that images a flat screen display 3 that moves to various positions 6 in space. As illustrated in FIG. 1, there are three different positions 6. The flat screen display 3 and the camera sensor have corresponding points 9 (for example, one pixel of the time coded pattern target 4 and one corresponding image point of the camera images 8 is illustrated).

Figure 2:
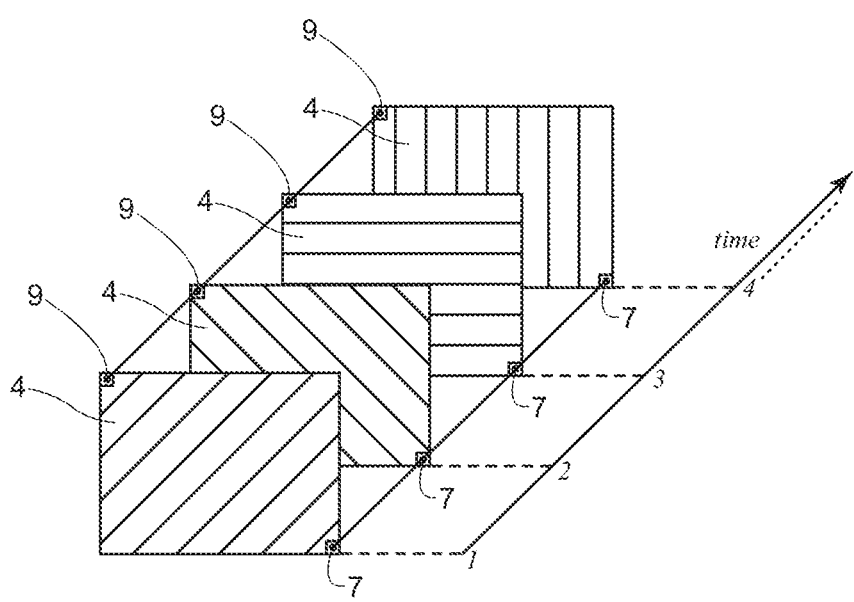
FIG. 2 illustrates a time coded pattern target.

FIG. 2 illustrates a time coded pattern target 4 at times 1, 2, 3, 4 . . . which is displayed upon the flat screen display 3. The time coded pattern target 4 includes one or more pixels 7 of the time coded pattern target 4. For example, in FIG. 2, there one pixel 7 of the time coded pattern target 4 is illustrated. These pixels 7 of the time coded target 4 may correspond to image points 8 of the captured camera images 5. For example, FIG. 2 illustrates one corresponding point 9 of the time coded pattern target. This corresponding point is also visualized in FIG. 3.

Figure 3:
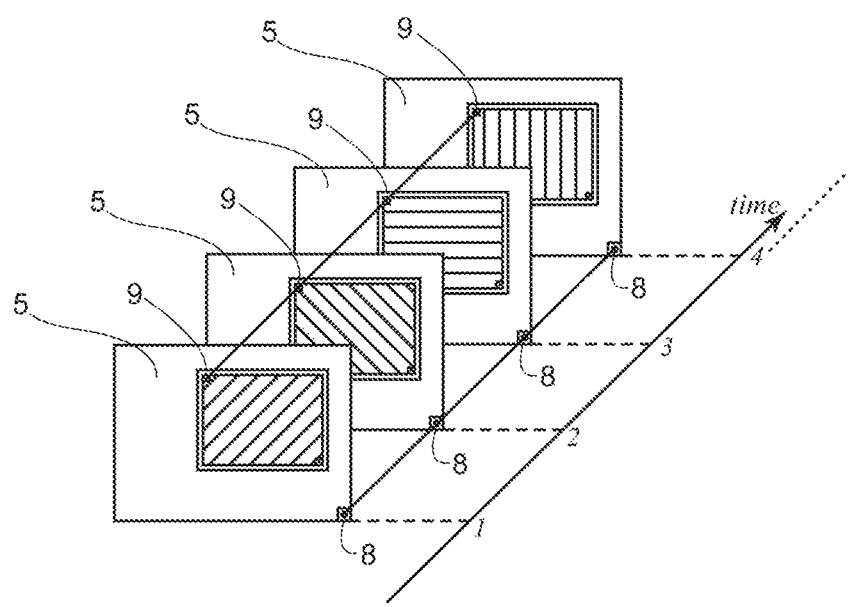
FIG. 3 illustrates a sequence of captured camera images.

FIG. 3 illustrates a sequence of captured camera images 5 at times 1, 2, 3, 4 . . . which correspond to the time coded pattern target 4 displayed upon the flat screen display 3. The captured camera images 5 each includes one or more image points 8 of the camera images. For example, in FIG. 3, there one image point 8 illustrated. These image points 8 of the captured camera images 5 may correspond to pixels 7 of the time coded target 4 that is displayed on the flat screen display 3 and acquired by the sensor camera 2. For example, FIG. 3 illustrates one corresponding point 9 of the camera images. The same corresponding point 9 is also visualized in FIG. 2.

Figure 4:
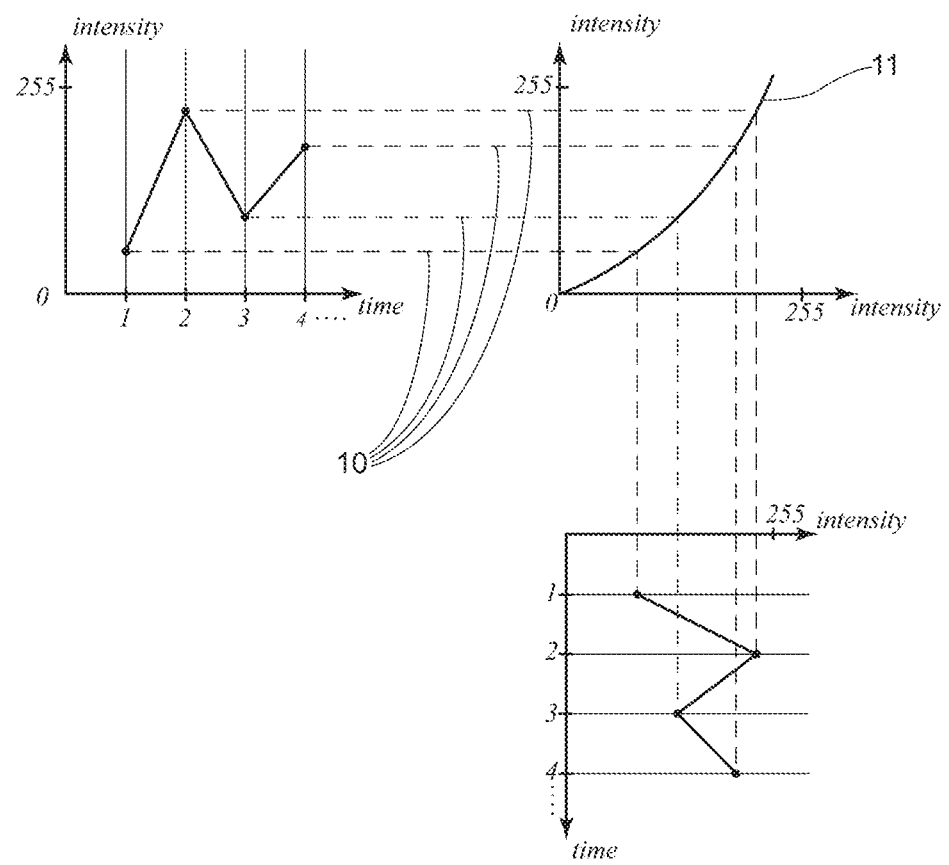
FIG. 4 illustrates the relationship between the original intensity (intensity) at various times, the gamma corrected intensity (intensity') at various times, and the gamma curve.

FIG. 4 illustrates the relationship (gamma correction of intensities) 10 between the original intensity (intensity) at various times, the corrected intensity (intensity') at various times, and the gamma curve 11 so as to provide good quality gamma correction. More specifically, time based sequentially detected intensities (intensity) are transformed (as illustrated by the lines 10) by the gamma curve 11 into corrected intensities (intensity').

Figure 5:
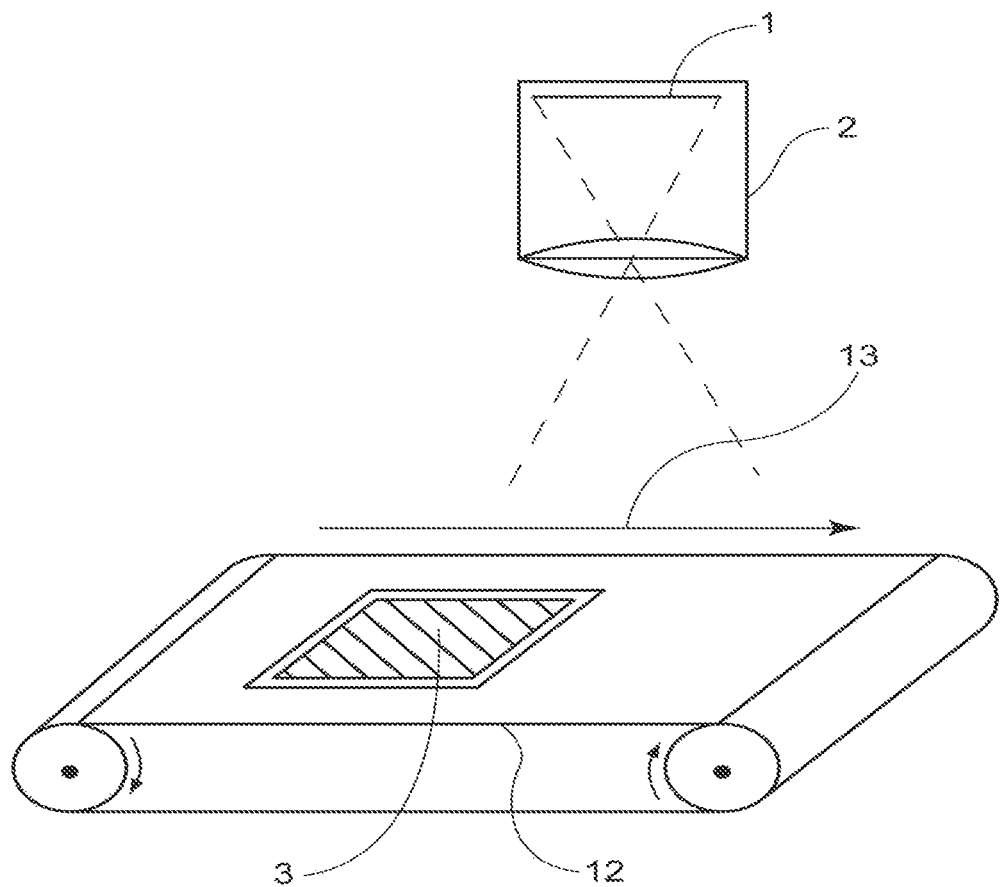
FIG. 5 illustrates another exemplary embodiment where a method of the invention may be practiced that has a linear conveying device.

FIG. 5 illustrates another exemplary embodiment where a method of the invention may be practiced. This exemplary embodiment includes the sensor camera 2 having the image capturing sensor 1 that images the flat screen display 3 located on a linear conveying device 12. The linear conveying device 12 moves in a movement direction 13 (here, for example, the movement is left to right).

Figure 6:
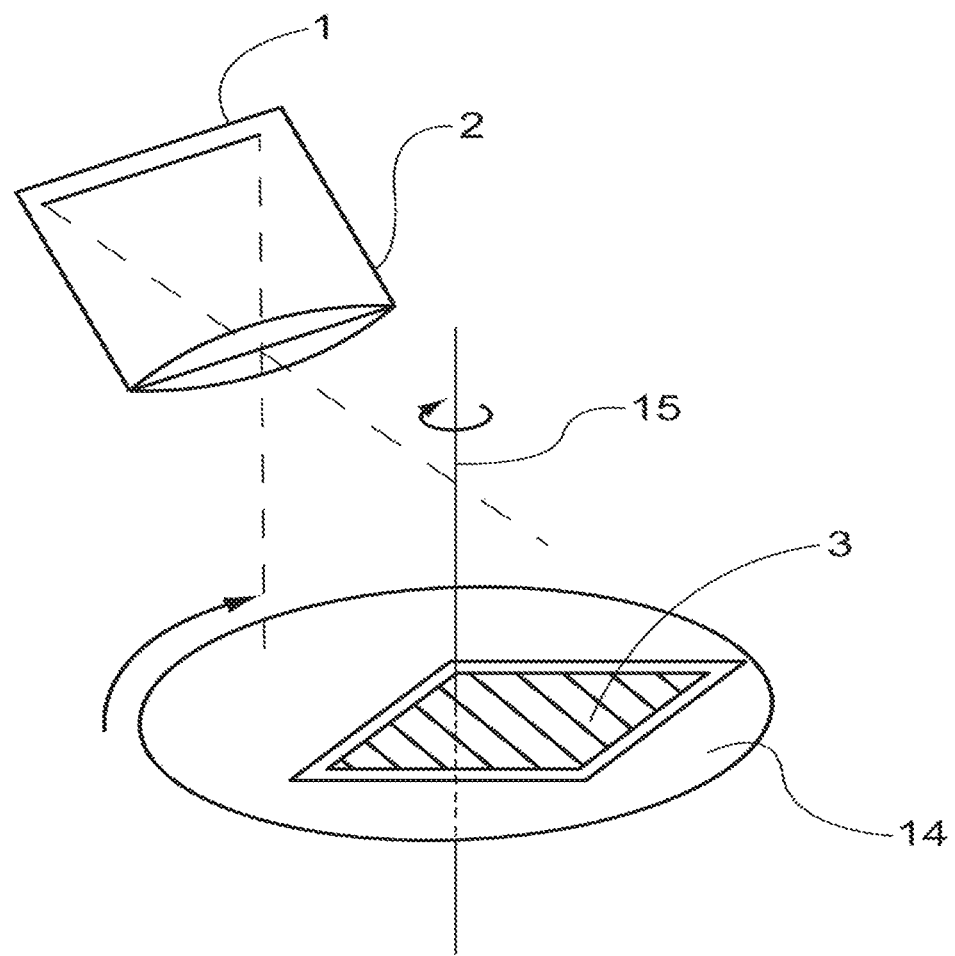
FIG. 6 illustrates another exemplary embodiment where a method of the invention may be practiced that has a rotating device.

FIG. 6 illustrates another exemplary embodiment where a method of the invention may be practiced. This exemplary embodiment includes the sensor camera 2 having the image capturing sensor 1 that images the flat screen display 3 located on a rotating device 14. The rotating device 14 has a rotation axis 15 about which the rotation device moves. In FIG. 6, the rotation of the flat screen display is clockwise.

Figure 7:
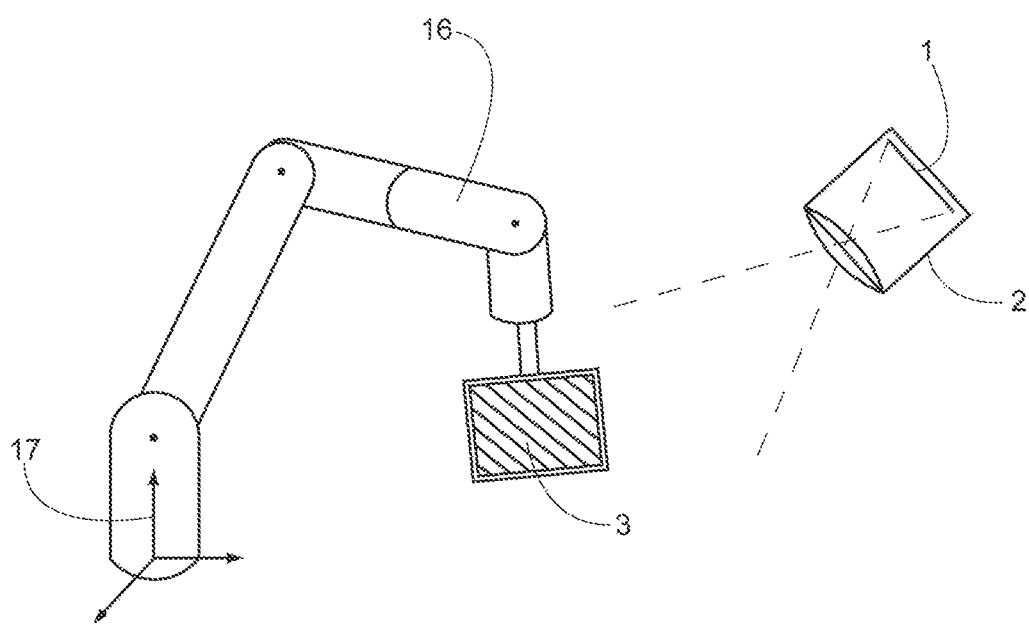
FIG. 7 illustrates another exemplary embodiment where a method of the invention may be practiced that has a flat screen display moved by a robotic device.

FIG. 7 illustrates another exemplary embodiment where a method of the invention may be practiced. This exemplary embodiment includes the sensor camera 2 having the image capturing sensor 1 that images the flat screen display 3. The flat screen display 3 is manipulated by a robotic device 16 in space according to a base coordinate system 17 of robotic device 16. Here the flat screen display 3 is moved by the robotic device 16 while the sensor camera 2 is fixed.

Figure 8:
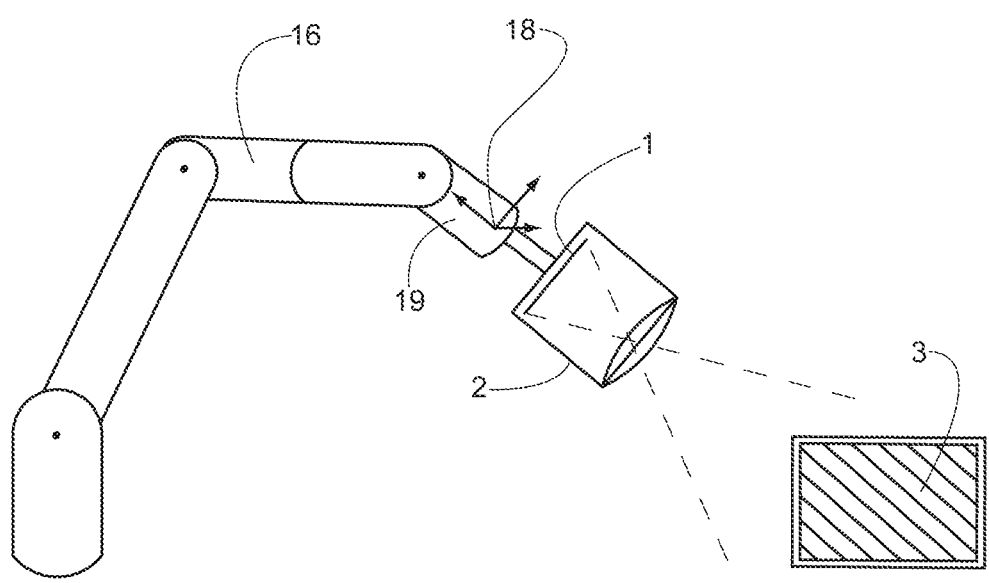
FIG. 8 illustrates another exemplary embodiment where a method of the invention may be practiced that has a sensor camera moved by a robotic device.

FIG. 8 illustrates another exemplary embodiment where a method of the invention may be practiced. This exemplary embodiment includes the sensor camera 2 having the image capturing sensor 1 that images the flat screen display 3. The sensor camera 2 having the image capturing sensor 1 is manipulated by a robotic device 16 in space according to a tool coordinate system 19 of a tool center point 18 of robotic device 16. Here the sensor camera 2 is moved by the robotic device 16 while the flat screen display 3 is fixed.

The various exemplary embodiments where a method of the invention may be practiced are representative embodiments and other embodiments may also be utilized. The above exemplary embodiments illustrate where either the sensor camera 2 or the flat screen display 3 are moved. However, both the sensor camera 2 and the flat screen display 4 may both be moving. Additionally, movement need not be linear or rotational but may be any kind of movement.

The method according to the invention was described with reference to advantageous embodiments. Features of these embodiments that are also apparent from the dependent claims can be combined into additional embodiments by a person skilled in the art.

REFERENCE NUMERALS AND DESIGNATION

1 Image capturing sensor
2 Sensor camera
3 Flat screen display
4 Time coded pattern target
5 Captured camera images
6 Different positions of the flat screen display 3 in space
7 Pixel(s) of the time coded pattern target 4
8 Image points of the camera images 5
9 Corresponding points
10 Gamma correction of intensities
11 Gamma curve
12 Linear conveying device
13 Movement direction of the linear conveying device 12
14 Rotating device
15 Rotation axis of the rotating device 14
16 Robotic device
17 Base coordinate system of the robotic device 16
18 Tool center point of the robotic device 16
19 Tool coordinate system of the robotic device 16

The invention claimed is:

1. A method for calibrating an image capturing sensor including at least one imaging sensor using a time coded pattern target, the method comprising:
  generating for display a time sequence of homogeneous gray scale images on a screen;
  capturing the time sequence of homogeneous gray scale images by the at least one imaging sensor;
  determining a correcting gamma curve based on the captured time sequence of homogeneous gray scale images;
  subsequent to determining the correcting gamma curve, generating for display the time coded pattern target on the screen, wherein the time coded pattern target comprises a pattern sequence of a plurality of time coded patterns for sequential display in an image plane of the screen, wherein the pattern sequence of the plurality of time coded patterns is sequentially displayed in the image plane of the screen when the screen is located at a fixed position in space, wherein the pattern sequence of the plurality of time coded patterns is sequentially displayed in the image plane of the screen according to the correcting gamma curve;
  receiving from the image capturing sensor a sequence of images capturing the pattern sequence, each image of the sequence of images corresponding to a time coded pattern of the plurality of time coded patterns of the pattern sequence;
  determining an association between one or more pixels of the pattern sequence of the plurality of time coded patterns and one or more captured image points of the sequence of images and generating point correspondences for the fixed position of the screen in space; and calibrating the image capturing sensor based on the point correspondences.

2. The method according to claim 1,
wherein an additional automatic adaptation of an exposure time is performed for the at least one imaging sensor when capturing the screen in the fixed position in space, wherein a homogenous white image is displayed on the screen and captured by the at least one imaging sensor,
wherein the exposure time of the at least one imaging sensor is adjusted so that intensity values of the one or more image points of the screen that are captured by the at least one imaging sensor comply with a predefined optimization criterion at an end value of the exposure time.

3. The method according to claim 1,
wherein only a portion of the one or more pixels and the one or more captured image points is associated with each other when performing the association between the one or more pixels and the one or more captured image points and generating the point correspondences for each relative position of the screen with respect to the image capturing sensor,
wherein a homography between the displayed pattern sequence of time coded patterns and the captured sequence of images is computed from the point correspondences,
wherein the homography limits a relevant search area for additional point correspondences between the displayed pattern sequence of time coded patterns and the captured sequence of images.

4. The method according to claim 1, wherein the association between the one or more pixels of the pattern sequence of time coded patterns and the one or more captured image points of the sequence of images and the generation of the point correspondences is performed within a predefined grid.

5. The method according to claim 1,
wherein the screen is arranged on a tablet computer with a program running on the tablet computer and/or with a program running on an external control unit that communicates wirelessly with the tablet computer for generating for display the time-coded pattern target.

6. The method according to claim 1,
wherein the pattern sequence of the time-coded pattern target includes a sequence of statistically generated patterns.

7. The method according to claim 1,
wherein the pattern sequence of the time-coded pattern target includes a sequence of regular patterns including stripe patterns and/or checkerboard patterns.

8. The method according to claim 1,
wherein the screen is arranged on a linear conveying device, wherein a movement direction of the linear conveying device with respect to the image capturing sensor is determined by a movement of the screen caused by a linear movement of the linear conveying device.

9. The method according to claim 1,
wherein the screen is arranged on a rotating arrangement, wherein a position and an orientation of a rotation axis of the rotating arrangement with respect to the image capturing sensor is determined by an angular movement of the screen caused by a rotation of the rotating arrangement.

10. The method according to claim 1,
wherein the screen is arranged on moving components of a robot arrangement, wherein a rotation and/or a linear movement of one or more of the moving components of the robot arrangement is used to determine a position and an orientation of a base coordinate system of the robot arrangement with respect to the image capturing sensor.

11. The method according to claim 1,
wherein the image capturing sensor is connected with a tool point of a robot arrangement and the screen is statically arranged with respect to the robot arrangement, wherein a rotation and/or a linear movement of the tool point of the robot arrangement and the image capturing sensor is used to determine a position and an orientation of a tool coordinate system of the robot arrangement with reference to the image capturing sensor.

12. The method according to claim 1, wherein the screen comprises a flat screen display.

13. The method according to claim 12, wherein the flat screen display is arranged on a tablet computer.

14. The method according to claim 1, wherein the association is performed between the one or more pixels of the pattern sequence of time coded patterns and the one or more captured image points of the sequence of images to generate the point correspondences for the at least one fixed position of the screen in space and another different position of the screen in space.

15. A system for calibrating an image capturing sensor including at least one imaging sensor using a time coded pattern target, the system comprising a processor configured to:
generate for display a time sequence of homogeneous gray scale images on a screen;
capture the time sequence of homogeneous gray scale images by the at least one imaging sensor;
determine a correcting gamma curve based on the captured time sequence of homogeneous gray scale images;
subsequent to determining the correcting gamma curve, generate for display the time coded pattern target on the screen, wherein the time coded pattern target comprises a pattern sequence of a plurality of time coded patterns for sequential display in an image plane of the screen, wherein the pattern sequence of the plurality of time coded patterns is sequentially displayed in the image plane of the screen when the screen is located at a fixed position in space, wherein the pattern sequence of the plurality of time coded patterns is sequentially displayed in the image plane of the screen according to the correcting gamma curve;
receive from the image capturing sensor a sequence of images capturing the pattern sequence, each image of the sequence of images corresponding to a time coded pattern of the plurality of time coded patterns of the pattern sequence;
determine an association between one or more pixels of the pattern sequence of the plurality of time coded patterns and one or more captured image points of the sequence of images and generate point correspondences for the fixed position of the screen in space; and
calibrate the image capturing sensor based on the point correspondences.

16. A non-transitory computer readable medium having encoded thereon executable instructions that, when executed by at least one processor, perform a method for calibrating an image capturing sensor including at least one imaging sensor using a time coded pattern target, the method comprising:

generating for display a time sequence of homogeneous gray scale images on a screen;

capturing the time sequence of homogeneous gray scale images by the at least one imaging sensor;

determining a correcting gamma curve based on the captured time sequence of homogeneous gray scale images;

subsequent to determining the correcting gamma curve, generating for display the time coded pattern target on the screen, wherein the time coded pattern target comprises a pattern sequence of a plurality of time coded patterns for sequential display in an image plane of the screen, wherein the pattern sequence of the plurality of time coded patterns is sequentially displayed in the image plane of the screen when the screen is located at a fixed position in space, wherein the pattern sequence of the plurality of time coded patterns is sequentially displayed in the image plane of the screen according to the correcting gamma curve;

receiving from the image capturing sensor a sequence of images capturing the pattern sequence, each image of the sequence of images corresponding to a time coded pattern of the plurality of time coded patterns of the pattern sequence;

determining an association between one or more pixels of the pattern sequence of the plurality of time coded patterns and one or more captured image points of the sequence of images and generating point correspondences for the fixed position of the screen in space; and calibrating the image capturing sensor based on the point correspondences.

* * * * *